United States Patent [19]

Melcher

[11] 4,222,520
[45] Sep. 16, 1980

[54] IRRIGATION MACHINE

[76] Inventor: Leland J. Melcher, 10835 Kalamath, Northglenn, Colo. 80234

[21] Appl. No.: 19,485

[22] Filed: Mar. 12, 1979

[51] Int. Cl.$^2$ .............................................. A01G 25/09
[52] U.S. Cl. .................................. 239/70; 137/899.1; 137/578; 210/157; 239/179; 366/195; 405/36
[58] Field of Search ............... 137/142, 147, 344, 578; 405/36; 366/195; 210/157, 161; 239/67, 70, 179–181, 183, 184, 590

[56] References Cited

U.S. PATENT DOCUMENTS

| | | | |
|---|---|---|---|
| 1,412,230 | 4/1922 | Cuttle | 210/157 |
| 2,918,800 | 12/1959 | Ford | 239/179 |
| 3,203,336 | 8/1965 | Limberger | 137/147 X |
| 3,303,655 | 2/1967 | Loomis | 405/36 |
| 4,053,413 | 10/1977 | Miller | 405/36 X |

*Primary Examiner*—Andres Kashnikow
*Attorney, Agent, or Firm*—Kyle W. Rost

[57] ABSTRACT

A framework mounted on wheels to follow a ditch path carries a plurality of siphon tubes suspended at their outer end from an arm pivotable in response to a float detecting the water level in the ditch, and the inner end of the tubes contain water impeller blades mounted on a common shaft through all tube heads, retaining the heads in submerged position in the ditch. The structure supporting the outer tube ends is spring biased to raise the tubes, and each tube has a flexible mid-portion and a water trap in the outer end. A silt remover agitator is mounted on a longitudinal track and powered to move between the opposite ends of the framework to entrain silt in the water for removal by the siphon tubes. A wheel trash remover at the upstream end of the framework is self-powered by the current to catch and eject debris from the ditch water, and a dam at the downstream end of the framework retains the ditch water under the framework. A clock timer controls the movement of the framework at fixed intervals by actuating an electric drive motor that also turns the impeller shaft at the conclusion of each movement.

14 Claims, 11 Drawing Figures

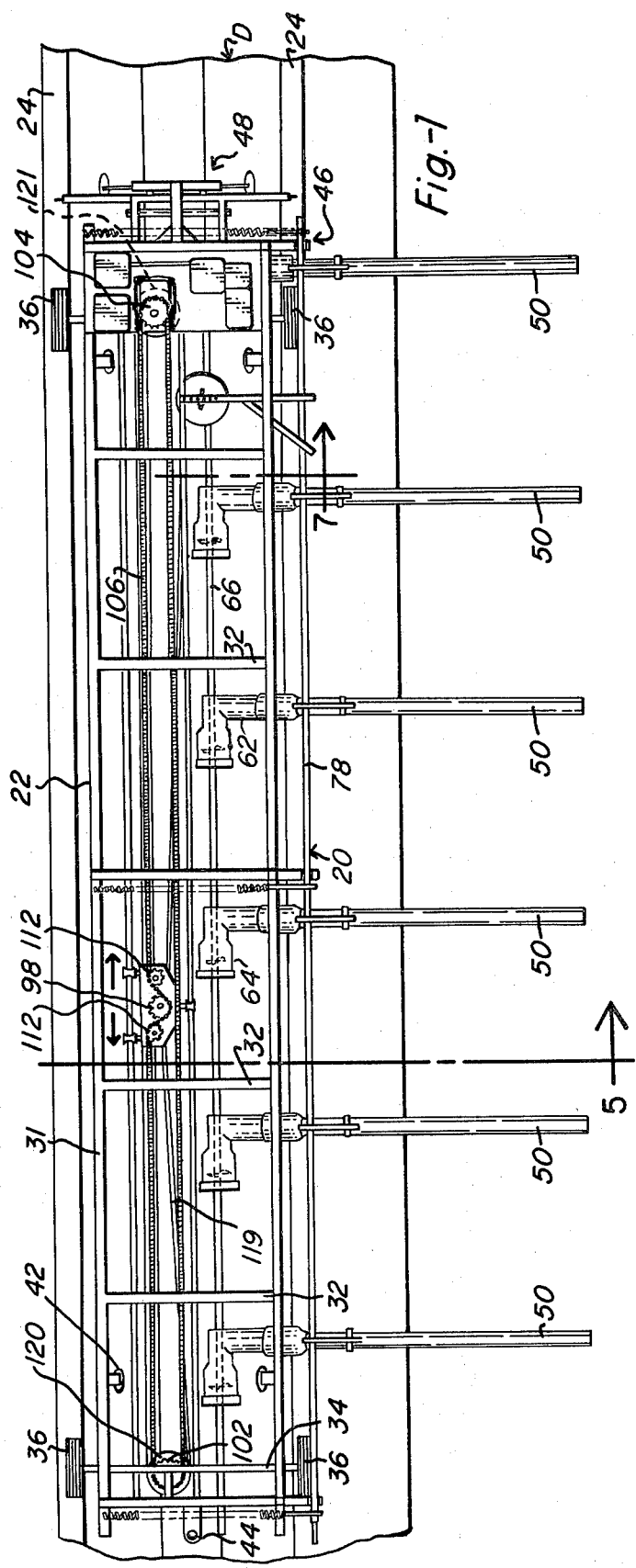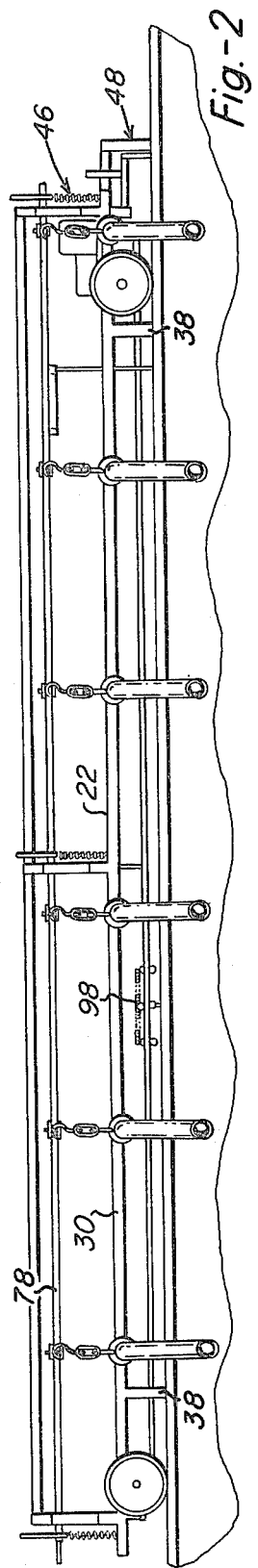

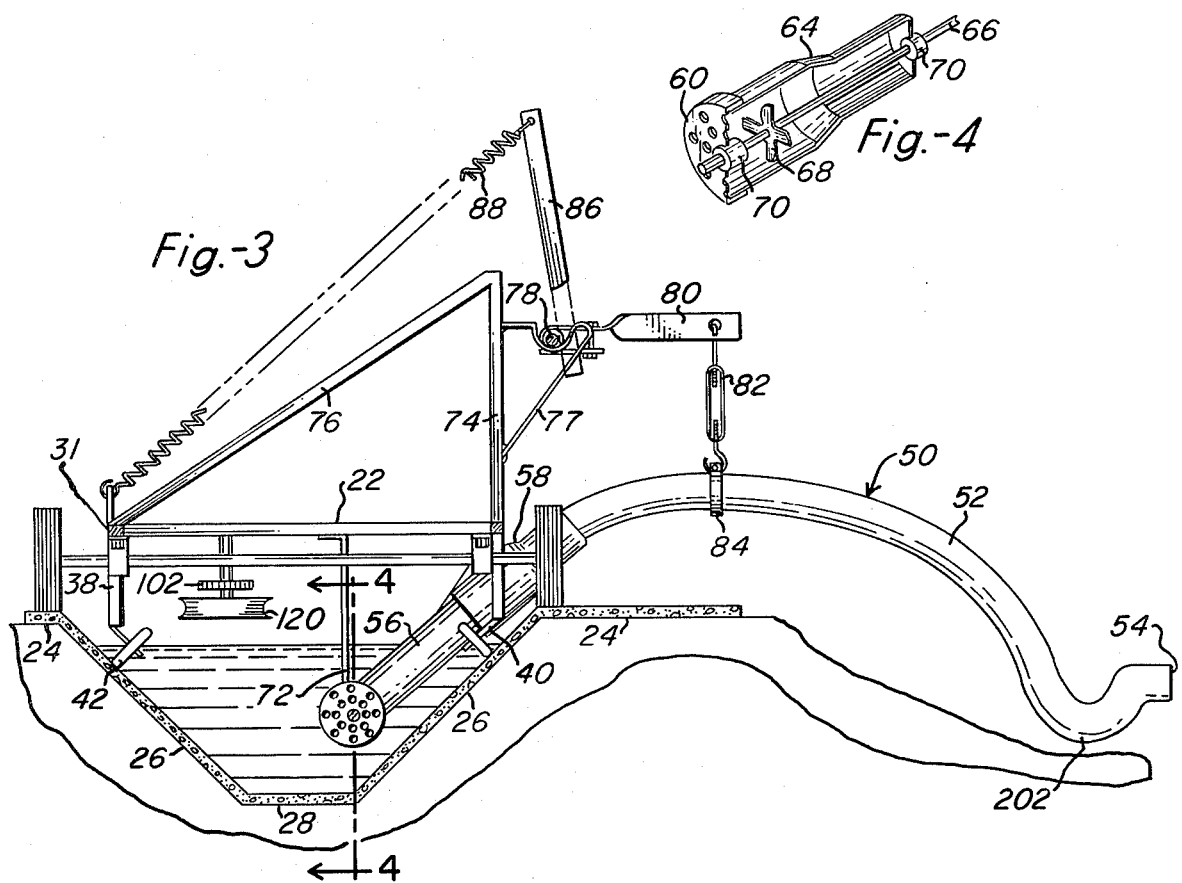
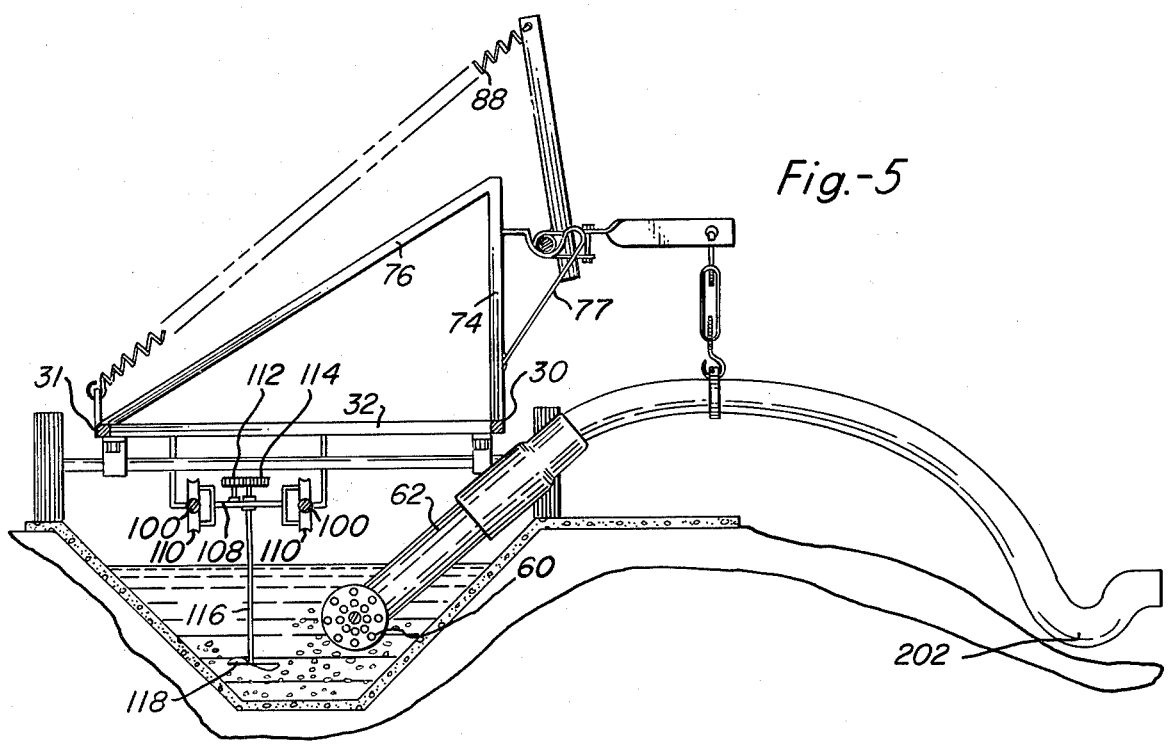

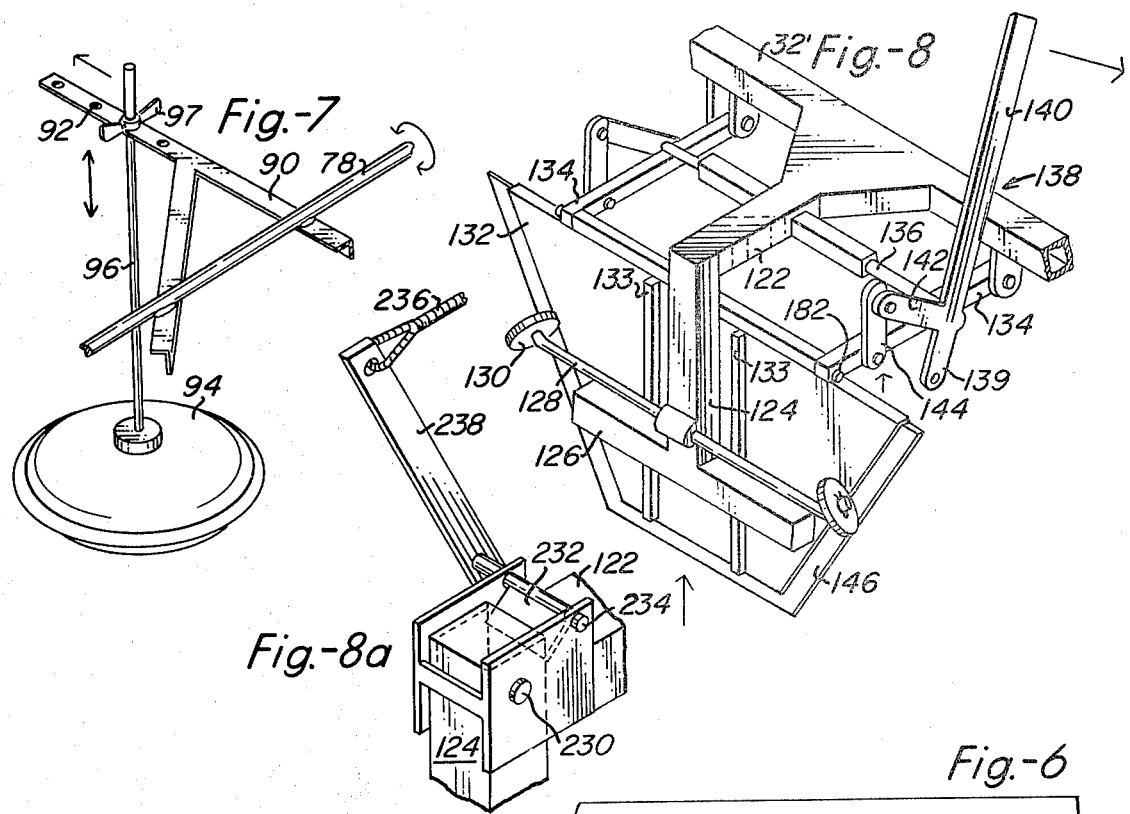

IRRIGATION MACHINE

BACKGROUND OF THE INVENTION

1. Field of the Invention

The invention relates generally to hydraulic and earth engineering, and more specifically to underground fluid storage and water control, as applied to channels and irrigation. An improved apparatus is disclosed for use in siphon tube flood irrigation from water supply ditches. The apparatus is especially adapted to deliver a carefully metered quantity of water between crop rows in balanced fashion.

2. Description of the Prior Art

The siphon tube flood method of farm irrigation is commonly practiced in the western part of the United States and other areas where water is supplied to farm fields through a system of water ditches. When it is necessary to irrigate a field, the farmer submerges an S-shaped siphon tube in the water and then sets the tube over the side of the ditch, one end in the ditch water and the other end in an adjacent plow furrow, thereby starting siphon action that brings ditch water into the furrow, where the water is allowed to run until the field is sufficiently irrigated. Ordinarily, one siphon tube is employed in every furrow. This method requires that each tube be manually started and stopped, and for this reason has required a substantial labor commitment.

Automated irrigation has been proposed for locations having water ditches. U.S. Pat. No. 3,303,655 to Loomis discloses a mobile framework mounted in wheels adapted to follow the edges of an irrigation ditch. The framework carries siphon tubes delivering some water to the field and some water against a water wheel that powers the continuous movement of the framework. A dam on the framework maintains a proper water level for the siphon tubes, but permits excess water to be used by a leading machine. U.S. Pat. No. 2,918,800 to Ford teaches a mobile machine having intermittent motion controlled by clocks. The device operates by following a cable and stops either at the location of stakes driven near the ditch or at abutments attached to the cable. U.S. Pat. No. 2,756,098 to Rottcher discloses a gasoline driven mobile framework and water pump, wherein the device rides on wheels, one of which follows the center of the ditch and acts as a dam and guide. Finally, U.S. Pat. No. 3,079,939 to LaPray relates to a self-priming siphon device for directing water from one ditch to a crossing ditch.

The present invention relates to an improvement in the operation of mobile irrigation apparatus of the types generally known, and to the creation of an apparatus that is capable of performing functions not previously found on mobile irrigation devices. However, certain aspects of prior known irrigation machines may also be utilized with the present invention. The above noted Ford patent, for instance, teaches the use of an electric motor to advance a mobile framework along an irrigation ditch, as activated by clock timers. It is also taught in this patent that abutments on a cable may strike a trigger to influence a mechanical action, and that a gasoline engine on the framework may recharge batteries for the electric motor. The Loomis patent discloses a mobile framework that follows the shoulders of a concrete lined ditch and employs a dam at one end of the framework to retain a suitable water level for operation of siphon tubes. To the extent that may be required, the Ford and Loomis patents are incorporated by reference for the teachings of such devices as are common to the present invention.

SUMMARY OF THE INVENTION

In a mobile framework adapted to follow the longitudinal path of a water supply ditch for irrigation purposes, a plurality of siphon tubes extend transversely of the framework and ditch and are carried by a longitudinally pivotal hinge bar, via appropriate arms such that when the bar pivots in a first direction the tubes are lowered, and when the bar pivots in a second direction the tubes are raised. Also connected to the bar is a float adapted to rest in the ditch water, and the float is connected to the bar by a suitable bracket such that a change of water height in the ditch is transmitted through the bracket to pivot the bar, causing the tubes to be lowered when the water level is higher, and vice versa. In this way, the tubes adjust their flow rate automatically in response to the amount of water available in the ditch, and consequently, tend to avoid running dry or allowing an excess of water to pass unused to a further point along the ditch. The hinge bar is biased to raise the tubes by means of a resilient spring attached to a suitable spring arm extending from the hinge bar in a plane transverse to the bar. The spring then tends to raise the tubes when the tubes are not in operation and do not contain the weight of the water, and the spring allows the tubes to lower and commence operation when the tubes have been primed and are initially full of water.

A suitable motor, such as an electric motor, is carried by the framework and is actuated by a timer to drive the framework on wheels or the like along the path of the ditch. At stopping points along the ditch, as determined by stakes planted in the ground or other suitable marking means, a trigger on the framework is tripped to deactivate the motor until again actuated by the timer. In order to prevent washout of crop row structure adjacent to the ditch, the irrigation machine automatically shuts-off the siphon tubes at the start of movement and restarts the tubes when the framework has reached the next stopping point. This is accomplished by devices that, indirectly at least, are responsive to the timer for their operation. The shut-off mechanism may be a trip lever operated by the marking stake as the framework moves past the stake at the start of a move. The lever is connected to a mechanism that pivots the hinge bar to raise the siphon tubes sufficiently to lose prime, after which the spring retains the tubes in raised position. At the stopping point, the timer may directly cause the motor to operate an impeller head on each tube to drive water through the tubes and establish prime, after which the springs will allow the tubes to lower to continue operation. A single shaft may run through all impeller heads and serve as an anchor and pivot point for the intake ends of the tubes. A flexible sleeve between the impeller heads and the main tube bodies allows the tube bodies to deflect without damaging the impeller shaft if they strike a foreign object while the framework is moving.

A dam at the downstream end of the framework collects water under the framework to assure an adequate depth for the siphon tubes. During movement of the machine, the dam may be slightly raised by a mechanical linkage indirectly responsive to the timer, as by a trip lever striking the marking stake, and when the machine reaches the next stake, another trip lever may operate a linkage to lower the dam. Alternatively, direct timer control of these functions may be accomplished by means of timer actuated solenoids operating the required linkages.

Unwanted debris and silt in the irrigation ditch can be automatically removed by means of a silt remover and a trash remover. The silt remover is a mobile carriage with a water impeller that travels between the opposite ends of the framework continuously, stirring-up silt on the ditch bottom so that the siphon tubes can discharge the silt from the ditch. The carriage and impeller may be operated by a gasoline engine that also powers a generator for recharging the batteries of the electric drive motor. The trash remover is a mesh water wheel at the upstream end of the machine that receives and filters the ditch water through the inside of the wheel. Suitable water directing shields guide the water to the desired locations. The wheel is driven by the water flow and in turn drives a laterally directed conveyor belt that receives the filtered trash and carries it to the side of the ditch.

The primary object of the invention is to create an automatic irrigation machine that is suitable for the siphon tube flood method of irrigation and is able to deliver water in a controlled manner to individual crop rows without destroying the crop row structure. The present irrigation machine accomplishes these goals through the capability to individually control the flow rate of each siphon tube by individual adjustment of tube attitude to accomodate soft and hard crop rows, and further by the automatic flow control of all tubes on the machine in accordance with the water level in the ditch. The added capability for the machine to shut-off the tubes prior to movement and to restart the tubes after movement prevents wash-out of furrow structure that is relied upon to direct the water across a field.

Another object is to remove unwanted debris and silt from the irrigation ditch. An integral trash remover on the upstream end of the machine removes trash from the immediate water entering the area under the machine, and in this way operates with maximum efficiency in the area where the trash would create a problem. A silt remover reciprocates between the opposite ends of the machine to stir-up fine dirt and silt on the bottom of the ditch, enabling the siphon tubes to remove the silt with the normal discharge of water. A cooperating factor in the machine structure is that the intake ends of the siphon tubes are held at a relatively fixed depth below the machine by the impeller head shaft, so that the intake ends are not substantially lifted or lowered when the tube attitude is automatically changed to compensate for water depth. Thus, the intakes are held at a relatively deep depth in the ditch so that they will take maximum advantage of whatever water is available. Correspondingly, the heads tend not to be clogged by any trash that does escape the trash remover, and they also are in the immediate area of the stirred-up silt for efficient removal.

BRIEF DESCRIPTION OF THE DRAWINGS

FIG. 1 is a top view of one unit of the machine.
FIG. 2 is a side view thereof.
FIG. 3 is an end view thereof taken from the left end of FIG. 1, with the power unit, dam, and agitator eliminated for clarity.
FIG. 4 is a perspective view of an impeller head in partial section.

FIG. 5 is a cross-sectional view of the machine taken along the plane of line 5 of FIG. 1.
FIG. 6 is a top view of a debris remover attachment to the machine.
FIG. 7 is a perspective view of a float and related support structure taken along the plane of line 7 of FIG. 1.
FIG. 8 is a perspective view of the dam assembly.
FIG. 8a is an enlarged detail of the dam assembly.
FIG. 11 is a side view of the trash remover of FIG. 6.

DESCRIPTION OF THE PREFERRED EMBODIMENT

Figure 9:
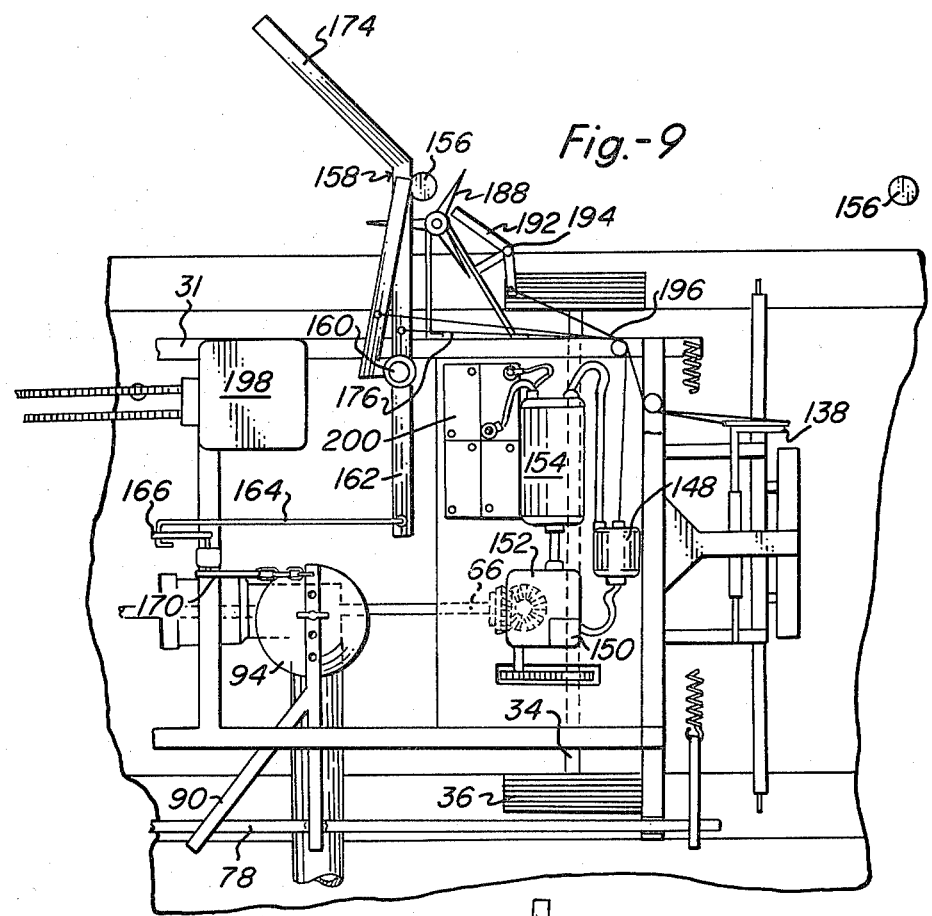
FIG. 9 is a top view of the power unit.

The automatic tube irrigating machine 20 is shown in FIGS. 1 and 2 to include a mobile framework 22 that operates along the path established by an irrigation ditch D, which preferably is of the type having a concrete lining that establishes a fixed and uniform ditch cross-section and a pair of opposite ditch shoulders 24. As is best shown in FIGS. 3 and 5, the ditch cross section is typically V-shaped, as defined by a pair of lateral sides 26 connecting the shoulder 24 to the ditch floor 28. The framework 22 defines a single segment or unit of the automatic irrigator 20, and may be operated alone or in combination with additional similar units to form a linked series of irrigating units as will be subsequently described.

The basic framework 22 includes such structural members as are required to carry the irrigating apparatus on the framework. In the disclosed embodiment, each framework is in the shape of a rectangle having a longitudinally extending side frame member 30, 31 at the opposite major edges, and having a plurality of transversely extending stringers 32 joined to the two members 30, 31 to unite the frame structure. Near each of the opposite longitudinal ends of the frame, a horizontal transverse axle 34 carries a pair of wheels 36 adapted to ride on the shoulders 24 of the ditch. At longitudinal locations along frame members 30, 31 near axles 34, depending supports 38 carry inclined axles 40, in turn carrying guide wheels 42 that ride along the ditch sides 26 to maintain proper alignment between the machine 20 and the ditch. The wheels 42 may be replaced in function by other means for guiding the machine along the ditch path, such as railroad style wheels on axle 34 that both support the machine on the ditch shoulder by means of one part of the wheels and guide the machine along the ditch path by means of a flange at the side of the wheels. At one or both ends of the framework, a coupling or hitch 44 may interconnect two of the frameworks, although the specific embodiment of FIGS. 1 and 2 illustrates a leading framework having such a hitch only on its trailing end, at the left of the figures. A power unit assembly 46 and dam assembly 48 are at the right edge of these two figures. A plurality of siphon tubes 50 are carried by the framework at a suitable longitudinal spacing to deliver water to an adjacent field, preferably at a spacing approximately corresponding to one or more crop rows between adjacent tubes.

Each siphon tube 50 has a tube body 52 shaped somewhat in an S-shape for the purpose of curving over the ditch side and providing an outlet 54 to discharge water onto the field. At the inner end of each tube is an intake head 56 that is submerged in ditch water when the tube is operating. The intake head is connected to the tube body by a flexible sleeve 58 such as a rubber hose, permitting the body and head to flex in a situation where the body strikes an obstruction outside the ditch. The intake head is provided with a filter screen 60 to prevent large objects from entering the tube. Head 56 is preferably in the shape of an L with the major leg 62 connected by the sleeve 58 to the body and the minor leg 64, FIG. 4, aligned perpendicularly to the plane established by the S-shaped tube body and parallel to the longitudinal axis of the framework 22, with the screen 60 facing in the rearward direction. Each minor leg 64 constitutes an impeller head for the siphon tube and houses an impeller shaft 66 with impeller blade 68 carried thereon inside the head. Suitable bearings 70 support the shaft in the screen and through the wall of the head. Shaft 66 is common to all of the impeller heads within the single framework 22, holding the heads 56 in alignment. The shaft 66 is also supported by brackets 72, depending from the framework 22.

The siphon tubes are also supported on the framework by a superstructure best shown in FIGS. 3 and 5 to include a riser 74 and a diagonal brace 76, the former being connected to frame member 30 on the outlet side of the framework, and the latter being connected to the frame member 31 on the opposite or intake side of the framework and to the top of the riser. A fixed support frame 77 on the riser carries a hinge bar 78, best shown in FIG. 2 to extend for substantially the entire longitudinal length of the framework. Fixed to the hinge bar above the location of each siphon tube is a laterally extending pivot arm 80 that near its outer end supports the siphon tube body by means of an adjustable coupling such as turnbuckle 82 hooked through siphon tube collar 84. At various spaced locations along hinge bar are fixed spring arms 86 extending generally upwardly from the hinge bar and having a resilient member such as spring 88 connected between the top of the spring arm and frame member 31 to apply a lifting force to the siphon tubes through a torsional moment applied to the hinge bar. By means of the support system described above, the siphon tubes are carried in a manner by which the heads 56 are in a somewhat permanent location as established by the impeller shaft joined to each head, although each head may pivot vertically on the shaft; and each tube body is carried on a resiliently spring biased framework that permits each tube to be set at a predetermined vertical attitude by means of the turnbuckle, while allowing the entire bank of tubes on each framework to have its vertical attitude altered through torsional moments applied to the hinge bar. The horizontal attitude of each tube is generally fixed, although the flexible sleeve 58 and rather loose, suspended relationship between the tube and the turnbuckle allows each tube body to be pivoted horizontally as required.

With reference now to FIGS. 7 and 9, the hinge bar 78 also is connected to a flat bracket 90 extending toward frame member 31 and having formed therein several potential float carrying holes 92 allowing a ratio change in the lift provided by the float. A float 94 on an appropriate length-adjustable plunger rod 96 depends from the bracket into the ditch water. As can be readily seen from this arrangement, as the ditch water rises, the float will rise and urge the hinge bar to lower the siphon tube bodies; and as the level of the ditch water falls, the float will fall and tend to raise the siphon tube bodies. By raising and lowering the siphon tubes, the float influences the flow rate through the tubes to stabilize the water level in the ditch, as will be explained subsequently. Adjusting means such as nut 97 permits the float to be set at a desired height.

A further function of the machine 20 is to remove silt from the irrigation ditch during the irrigation process. With reference to FIGS. 1, 2, 3 and 5, a silt agitator 98 is carried by the framework 22 to constantly stir the water near the bottom of the ditch and thereby allow the silt to be discharged with the irrigation water. The framework supports a pair of spaced, parallel longitudinal tracks 100 from the stringers 32. At the rear end of the framework is an idler gear 102, and at the forward end is a driver gear 104, both of which are attached to a continuous loop of roller chain 106. A moveable carriage 108 is guided along the length of the tracks 100 by wheels 110. One run of the chain 106 passes over the carriage, where it engages two spaced idler gears 112 and an intermediate agitator gear 114 that is connected to a depending agitator shaft 116 to rotate agitator blade 118. As the chain is driven by the gear 104, the chain is guided into continuous contact with gear 114 to impart rotational motion to the agitator blade. The carriage 108 is connected to a drive cable 119 that forms a loop between the opposite ends of the framework 22. Cable 119 travels around a pulley 120 at the rear end of the framework and is driven by powered sheave 121 at the forward end of the framework to pull the carriage between opposite ends of the framework. The powered sheave may be conventionally designed to reverse its direction when the carriage reaches one end of the framework and strikes a trigger, or a stop on the cable may strike a trigger to reverse the carriage. Thus, when the siphon tubes are in the process of irrigating a field, the silt remover will constantly stir fine silt and mud into mixture with the ditch water, allowing the siphon action to remove the silt from the ditch.

The dam assembly 48 is located at the forward end of the framework 22 and is anticipated to be the only such assembly needed in a linked series of similar frameworks. The dam is connected to the forward stringer 32', which has a forward longitudinally extending brace 122 extending over the top of the dam assembly and terminates at its forward end in a depending stop 124 that carries at its lower end a cross bar 126 and axle 128 carrying guide wheels 130 thereon for following the path of the ditch along side walls 26. The dam further includes dam gate 132 in a substantially vertical plane transverse to the longitudinal axis of the framework 22 and having vertical forward supports 133 thereon. The gate is suspended from pivot arm 134 pivotally connected at the top of the gate and at the bottom of stringer 32'. A raising mechanism for the gate includes transverse dam axle 136 connected across brace 122 at a spaced distance above the pivot arms 134, and T-shaped actuating arm 138 having legs 139, 140, and 142 joined to the axle 136 at the junction of the legs. Finally, a connecting link 144 extends between the end of the central leg 142 and the pivot arm 134, enabling the actuating arm to raise the dam by rearward motion of upper leg 140, pivoting the arm on axle 136. The lower and side edges of the gate 132 carry a flexible flange 146 for sealing against the bottom and sides of the ditch.

Figure 10:
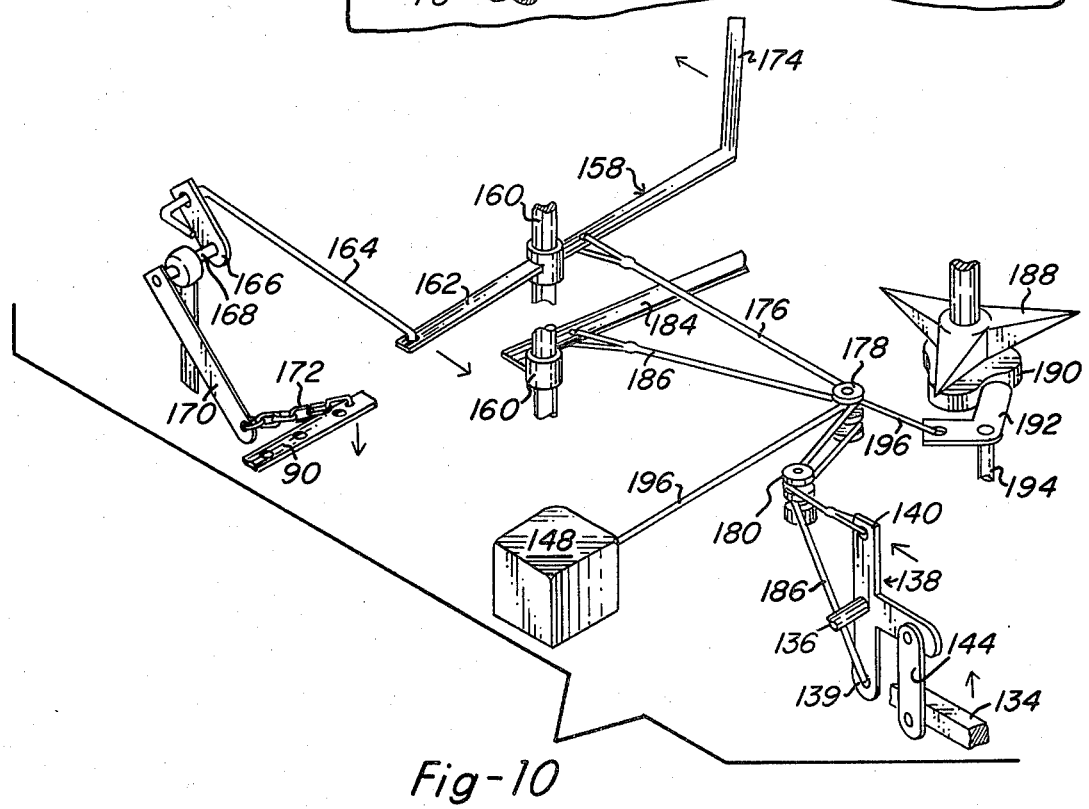
FIG. 10 is a schematic view of the machine controls.

The integrated operation of the parts heretofore described is best understood by reference to FIGS. 9 and 10, showing the power unit assembly 46. The machine 20 is intended to irrigate in intervals during which the framework 22 will remain at a stationary point along an irrigation ditch. During the stationary operation, the adjacent field is fully irrigated, after which machine moves forwardly along the ditch to a next preselected stopping location, where the irrigation process is repeated. The operation is controlled by an electrical timer 148, which, at a preselected time energizes solenoid 150 to initiate movement of the machine. The solenoid is mounted on gear box 152, where it controls a gear shift mechanism spring loaded to impeller shaft position; however, when activated, the solenoid causes the gear shift mechanism to move into framework drive position. The timer also activates motor 154 immediately thereafter to power the gear box, which transmits rotational motion to the adjacent axle 34 to power the drive wheels. The power transmission means between the gear box and the axle 34 may be of any suitable type, such as by gear, chain, or belt drive.

A stake 156 is placed along the edge of the irrigation ditch at each location where the irrigation machine is intended to stop. The exact locations for the stakes are determined in accordance with the length of the machine, among other factors. It is initially assumed for purposes of explanation that the machine is stopped at such a stake at the initiation of the described sequence, and that as soon as the wheels 36 start the machine in motion, the siphon tube shut off lever 158 contacts an adjacent stake and is deflected rearwardly. With reference to FIG. 10, the lever is pivoted at axis 160, with the result that the inward end 162 of the lever moves forwardly to actuate a float draw-down apparatus. Specifically, the lever end 162 pulls connecting rod 164 forward, in turn causing crank arm 166 to pivot upwardly and forwardly, rotating bearing rod 168 and pivoting draw-down rod 170 downwardly and rearwardly. The draw-down apparatus and specifically rod 170 are carried by the framework 22 at a lower level than float bracket 90 and with the end of rod 170 near the end of the float bracket. A connecting chain 172 joins rod 170 to bracket 90 and transmits the downward motion of the rod to the bracket, drawing the float 94 substantially downwardly, below the normal water level. This, in turn, raises the siphon tubes as previously explained, with the result that siphon action stops and the tubes empty. Without the weight of the siphon water in the tubes, the springs 88 are able to retain the height by which pivot arms 80 support the tubes. The outer end 174 of lever 158 is angled outwardly and rearwardly, for example at 45 degrees, so that it will remain in contact with stake 156 for several seconds as the irrigation machine moves past the stake, allowing adequate time for the siphon tubes to lose prime.

Lever 158 also actuates a dam raising mechanism via cable 176 connected to the lever near pivot axis 160. The cable is routed on suitable guides 178, 180 to the upper leg 140 of actuating arm 138, where the cable pulls the arm rearwardly to raise the dam gate slightly, as previously described. It is necessary to only slightly relieve the contact between gate flange 146 and the ditch sides when the machine is moving to prevent undue wear on the flange. After the dam has been raised, it has been found that the dam tends to remain slightly raised during machine travel, primarily due to friction of the dam being held against the forward stop 124 and cross brace 126 by the head of water. However, the dam gate is equipped with an automatic pressure relief means in the form of a hinge 182 joining the pivot arm 134 to the top of the gate, allowing the gate to pivot rearwardly on hinge 182 if it should strike an obstruction in the ditch. One such obstruction might be an accumulation of silt plowed forward by the forwardly moving gate. The silt could therefore be passed-over by the moving gate, or if an accumulation of silt was directly under the gate at a stationary location, the gate would permit ditch water to wash the silt away until the water pressure on the gate were able to return the gate to vertical position against the cross brace.

The machine will advance along the ditch to the next stake 156 marking a stopping point. Dam lowering lever 184 extends forwardly of lever 158 when not biased by contact with stake 156 and will therefore strike the next stake before lever 158, pivoting on axis 160 to pull cable 186, which in turn pulls the lower leg 139 of arm 138 to apply a positive downward force to the dam gate. At approximately the same time, one prong of the three pronged mechanical shut-off lever 188 strikes the stake and rotates the lever by one-third turn. A three lobed cam 190 is associated to rotate with the lever 188, and cam follower arm 192 rides thereon. When arm 192 rides over one high point in the cam, the arm is pivoted at 194 and applies a pulling moment to cable 196, connected to timer 148. This action triggers the timer to shut off motor 154 and release solenoid 150, which in turn results in the transmission 152 returning to impeller shaft position. The timer will then observe a short delay time such as ten to thirty seconds for the water level to become re-established behind the dam. The timer then actuates the motor, engaging the gear box 152 to drive impeller shaft 66 for a short period of five to twenty seconds, during which the impeller blades are driven to prime the siphon tubes. As water enters the siphon tubes, the added water weight lowers the tubes against the tension of spring 88, and self-sustained siphon action commences. At the conclusion of the priming period, the timer stops the motor and the gear box remains in impeller shaft position. In this way, the machine advances from stake to stake along a path of indefinite length, without washing out the furrow structure of the field when in motion.

The silt agitator may be powered by an independent motor 198 that is in constant operation, or this feature may be omitted. Where motor 198 is used, this is preferred to be a gasoline powered motor that includes electrical generating means of any suitable form to apply a charging current to the batteries 200 that power the motor 154. Alternatively, the batteries 200 may be charged by independent charging means after each extended period of use.

In a typical application, a single framework 22 is fifteen feet long and supports six siphon tubes having thirty inch intermediate spacing, corresponding to the thirty inch spacing of crop rows. The framework may be joined to additional frameworks to form a longer unit that irrigates over a greater length of ditch between movements. Each added framework is hitched to the leading unit in train car fashion. The impeller shafts are also flexibly connected for operation from a single power unit assembly; and the silt agitator drive cable, tracks, and roller chain may also be extended for operation from the single motor 198.

From the description of overall operation, it should be understood that the irrigation machine is intended to operate where water delivery to individual crop rows is desired, and the delivery to each row of crops may also be regulated. One common irrigation problem with row crops is that every other row constitutes a "hard row" where the tractor wheel has compressed the ground, and this row is less able to absorb water than is the intermediate soft row. The irrigation machine 20 is able to accomodate this situation by individual adjustment of the siphon tubes. The turnbuckles 82 are adjustable to alter the delivery attitude of the tubes, so that every other tube may be set to deliver a smaller rate of flow to the hard rows. Then, by proper setting of the stakes 156, these hard row siphon tubes will align with the hard rows along the entire length of the ditch.

The automatic operation of float 94 is also useful to maintain the constant operation of the siphon tubes. If the water supply in the ditch should increase or decrease during machine operation, the float will detect the higher or lower water condition and will adjust the delivery attitude of the tubes to compensate. In an especially low-water situation, the tubes themselves are configured to maintain flow or the capability for resumption of flow through the presence of water trap 202 near the outlet end 54. Without this trap, when flow is at a very low rate, air may enter the tube and cause it to lose prime. The trap is a portion of the tube having its top wall below the outlet opening of the tube when the tube is in siphon position.

In locations where debris tends to gather in irrigation ditches, a trash removing device 204 may be desirable as an attachment to the irrigation machine. In FIGS. 6 and 11, the trash remover is shown to be a water powered attachment to the irrigation machine, fitting on the rear or upstream end by means of bracket arms 206 carrying a rotatable, water permeable cylinder 208 formed, for example, from a screen or mesh. The cylinder is carried on a concentric axle 210 that rotates in suitable bearings connected to the bracket arms. Radial support arms 212 connect the axle to the cylinder at one end of the cylinder, which would be the lower end as illustrated in FIG. 6. Thus, the area between the axle and the cylinder is free of interfering arms for substantially the entire cylinder width. A plurality of water drive plates 214 extend radially inwardly from the cylinder for a short distance to impart rotation in response to the passing flow in the ditch. Located within the cylinder and extending to the side opposite from the support arms, or to the top of FIG. 6, is a laterally directed conveyor belt 216 having sufficient length to extend over the side of the ditch. Rollers 218 and 220 carry the belt and are supported by suitable braces 222 from the bracket arms 206. The belt is powered by a low-geared connection 224 to the axle 210, so that the belt advances toward the ditch side at a gradual rate as the cylinder 208 rotates. A water impervious shield 226 covers the outer surface of the cylinder at the upstream end of the trash remover so that flowing ditch water must flow past the sides of the cylinder; and another water impervious shield 228 is located at each side of the forward or downstream part of the trash remover, adjacent to the edges of the cylinder, so that the flowing ditch water must flow into the cylinder and through the cylinder from the inside in order to continue downstream.

In operation the trash remover permits the ditch water to flow freely through the screen cylinder from the inside of the cylinder toward the leading framework 22 of the irrigation machine, imparting rotation to the cylinder in the clock-wise direction in FIG. 11. Weeds or trash in the ditch water are trapped against the inside of the screen, where they are lifted by the rotating cylinder and dropped by gravity onto the conveyor belt, which in turn gradually deposits the captured debris over the side of the ditch or in a cage.

With reference again to the water retaining dam assembly 48, as a safety measure to prevent an overly large head of water from building behind the dam, the dam may be equipped with an automatic release mechanism. The dam gate 132 may be hinged to swing either forwardly or rearwardly on hinge 182, but in normal operating conditions the gate is prevented from swinging forwardly past stop 124 and cross bar 126. The unit comprising the stop and cross bar may be on a pivotal hinge 230 at the forward end of brace 122. The top of stop 124, located above the pivot axis of the hinge 230, is prevented from moving rearwardly by pivot block 232 that may be pivoted on pivot pin 234 to free the top of stop 124 for rearward motion, which would permit the lower portion of stop 124 to pivot forwardly, in turn allowing the dam gate to pivot forwardly on hinge 182, thereby releasing the water retained behind the gate. The movement of the pivot block is controlled by a float similar to float 94, which detects an overly high water level in the ditch by rising and pivoting its float bracket 90, which applies a pulling force on a cable 236 connected to an activator arm 238 on the pivot pin 234. In this way, the overly high water level in the ditch causes the dam to release all retained water, preventing the water from overflowing the ditch and destroying the crop row structure that is depended upon as an irrigation aid.

Although the preferred embodiment has illustrated a water powered trash remover, a motor powered connection could be made by flexible cable or fixed shaft gearing to drive the cylinder and belt. An immediate source of such motor power would be from idler gear 102 in those machines employing the silt agitator, as this gear is at the rear end of the machine immediately adjacent to the trash remover.

Within the overall construction of the irrigation machine, considerable variation is possible in the specific mechanisms by which different functions are accomplished. Specifically, it is anticipated that mechanical functions now accomplished by lever and cable arrangements, such as the raising of the siphon tubes and lowering of the dam gate, could equally well be carried out through the use of electrically actuated devices and a more sophisticated timer, thereby eliminating the need for multiple levers striking the position-marking stakes. The above described embodiment should be understood to be offered for purposes of example, as an embodiment believed well suited for its intended uses in outdoor conditions, and not for purposes of limitation.

I claim:
1. A mobile irrigating machine for use along a water-carrying ditch, comprising:
   (a) a framework;
   (b) wheel means for mobily supporting the framework along the ditch;
   (c) timer means for determining the passage of preselected time intervals;
   (d) motive means responsive to said timer means for moving the irrigating machine a predetermined distance along the ditch at the conclusion of one of said intervals;
   (e) a plurality of siphon tubes carried by said framework, each having an inner end adapted to be submerged in the ditch water and an outer end adapted to extend over the side of the ditch to supply ditch water to adjacent land;
   (f) selectively actuatable water impeller means in the inner end of each siphon tube for forcing water through the tube;

(g) lifting means responsive to the timer means for elevating the outer end of the siphon tubes above the inner end thereof to unprime the tubes approximately when the motive means is starting a movement of the machine; and (h) activating means responsive to said timer means for actuating said water impeller means to prime the siphon tubes after the motive means has completed a movement of the machine.

2. The irrigating machine of claim 1, further comprising flow rate adjusting means responsive to the water level in the ditch for adjusting the attitude of the siphon tubes.

3. The irrigating machine of claim 2, wherein said flow rate adjusting means comprises:

(a) a hinge bar extending longitudinally of the framework, above said siphon tubes, and carried on a pivotal longitudinal axis by the framework;

(b) at least one pivot arm extending transversely of the framework and above the siphon tubes on a first side of the hinge bar, and having an inner end connected to the hinge bar;

(c) a linearly adjustable coupling joining the outer end of said pivot arm to at least one of the siphon tubes;

(d) a float bracket extending transversely of the framework on a second side of the hinge bar opposite from said first side and having an inner end connected to the hinge bar;

(e) float means connected to the outer end of the float bracket and adapted to be received by the ditch water for pivoting the hinge bar in response to the water level in the ditch.

4. The irrigating machine of claim 3, wherein said lifting means comprises means for pivoting the hinge bar to elevate the outer end of at least one siphon tube.

5. The irrigating machine of claim 3, wherein the flow rate adjusting means further comprises at least one spring arm connected at a first end to the hinge bar and extending in a plane transverse to the framework; and a resilient spring means connected between the second end of the spring arm and the framework for torsionally biasing the hinge bar to apply a lifting force to at least one siphon tube.

6. The irrigating machine of claim 1, wherein each siphon tube comprises an impeller head portion containing the inner end thereof and a body portion containing the outer end thereof, and a flexible sleeve portion connecting the impeller head and body portions for permitting the body portions to deflect during machine movement.

7. The irrigating machine of claim 6, wherein said water impeller means is located in the impeller head portion of each tube and further comprises a common shaft passing through a plurality of said impeller heads on the framework and having an impeller blade within each of the heads, said shaft having a connection to said activating means for commonly operating the impeller blades.

8. The irrigating machine of claim 1, wherein said siphon tube comprises a mouth at the outer end thereof and a water trap portion of the tube near the outer end, said water trap portion having top wall below the opening of the tube mouth when the tube is positioned to deliver water to the adjacent land.

9. The irrigating machine of claim 1, further comprising:

(a) a silt agitator extending below said framework for agitating silt on the bottom of the ditch;

(b) a guide track extending longitudinally of the framework;

(c) a carriage mounted for longitudinal motion along said guide track and carrying the silt agitator thereon;

(d) means for moving the carriage along the guide track; and (e) means for imparting rotation to the agitator.

10. The irrigating machine of claim 1, further comprising:

(a) a perforated rotatable water wheel for partial submersion in the ditch water on a transverse horizontal axis at one end of said framework adapted to be the upstream end thereof;

(b) a first water impervious shield extending axially of the wheel from the lower axial edge of the wheel facing the framework, and adapted to span the area between the axial edge of the wheel and the ditch side to direct ditch water through the perforations of the wheel from the inside thereof; and (c) means for catching debris falling from the top inside of the rotatable wheel and conveying the debris axially of the wheel.

11. The irrigating machine of claim 10, further comprising a second water impervious shield covering a lower portion of the outer circumference of said water wheel on the upstream face thereof.

12. The irrigating machine of claim 1, further comprising:

(a) a dam gate connected to one longitudinal end of said framework adapted to be the downstream end thereof;

(b) a forward stop connected to the framework and extending in front of the downstream face of said dam gate; and (c) hinge means connecting the top of the dam gate to the framework for allowing the bottom of the dam gate to move in the upstream direction during movement of the framework in response to an obstacle in the ditch.

13. The irrigating machine of claim 12, wherein said forward stop comprises a releasable hinge pivotable to move the forward stop in the downstream direction for releasing the dam gate in the downstream direction; and means responsive to high water level in the ditch for releasing said releasable hinge.

14. The irrigating machine of claim 1, wherein said predetermined distance of movement is determined by the location of fixed objects spaced along the ditch, and said impeller activating means comprises:

(a) a multipronged lever having at least three prongs radiating equally in a plane, mounted on said framework for rotation on an axis normal to said plane, and adapted move with the framework in the anticipated path to strike said fixed objects with a prong to rotate the lever;

(b) a cam coaxially mounted with said lever for rotation therewith and having an equal number of lobes as said prongs;

(c) a cam follower mounted pivotally on said framework and resting against said cam;

(d) means responsive to the movement of the cam follower over a cam lobe for engaging said motive means with the water impeller means.

* * * * *